Feb. 19, 1924.
H. O. BAKER.
COMBINATION WATER COLUMN AND WATER AND FUEL CONTROLLER
Filed Nov. 19, 1921    3 Sheets-Sheet 3
1,484,546
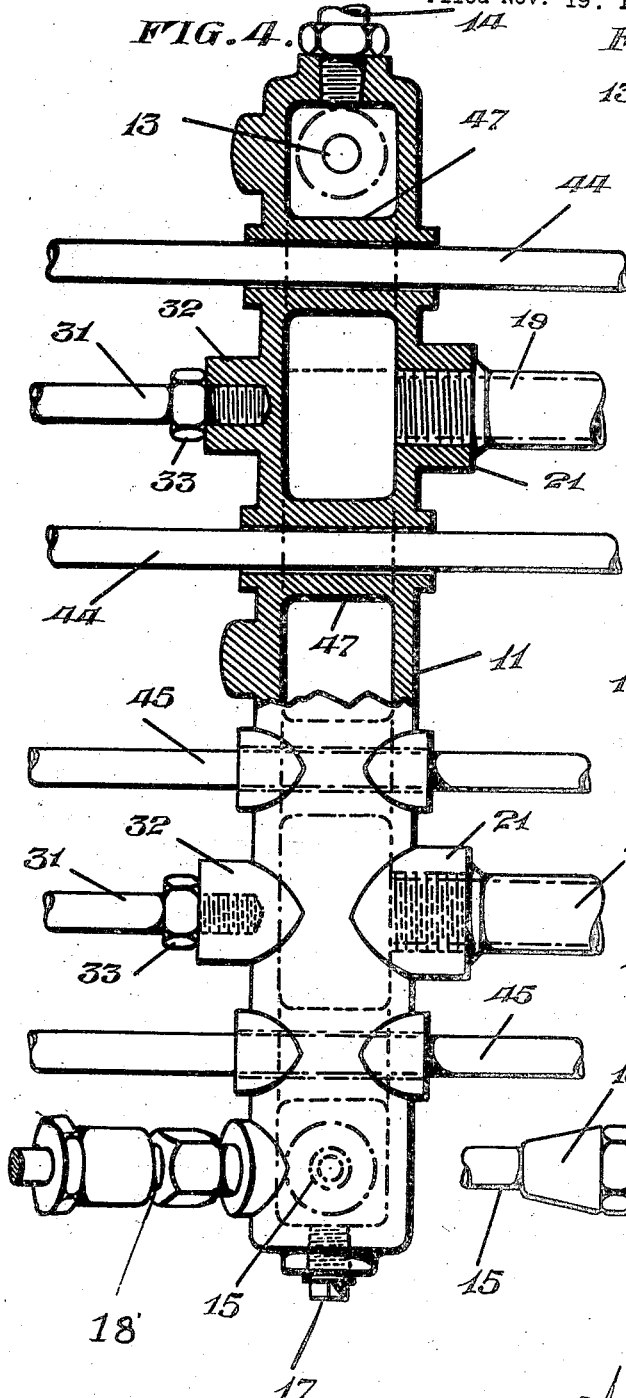
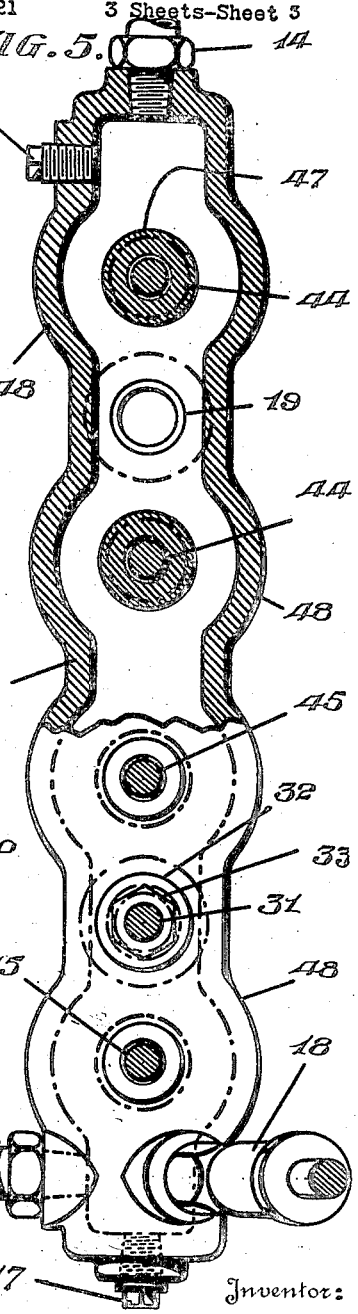
Inventor:
H. O. BAKER,
By W. T. Fitz Gerald & Co.
Attorney.

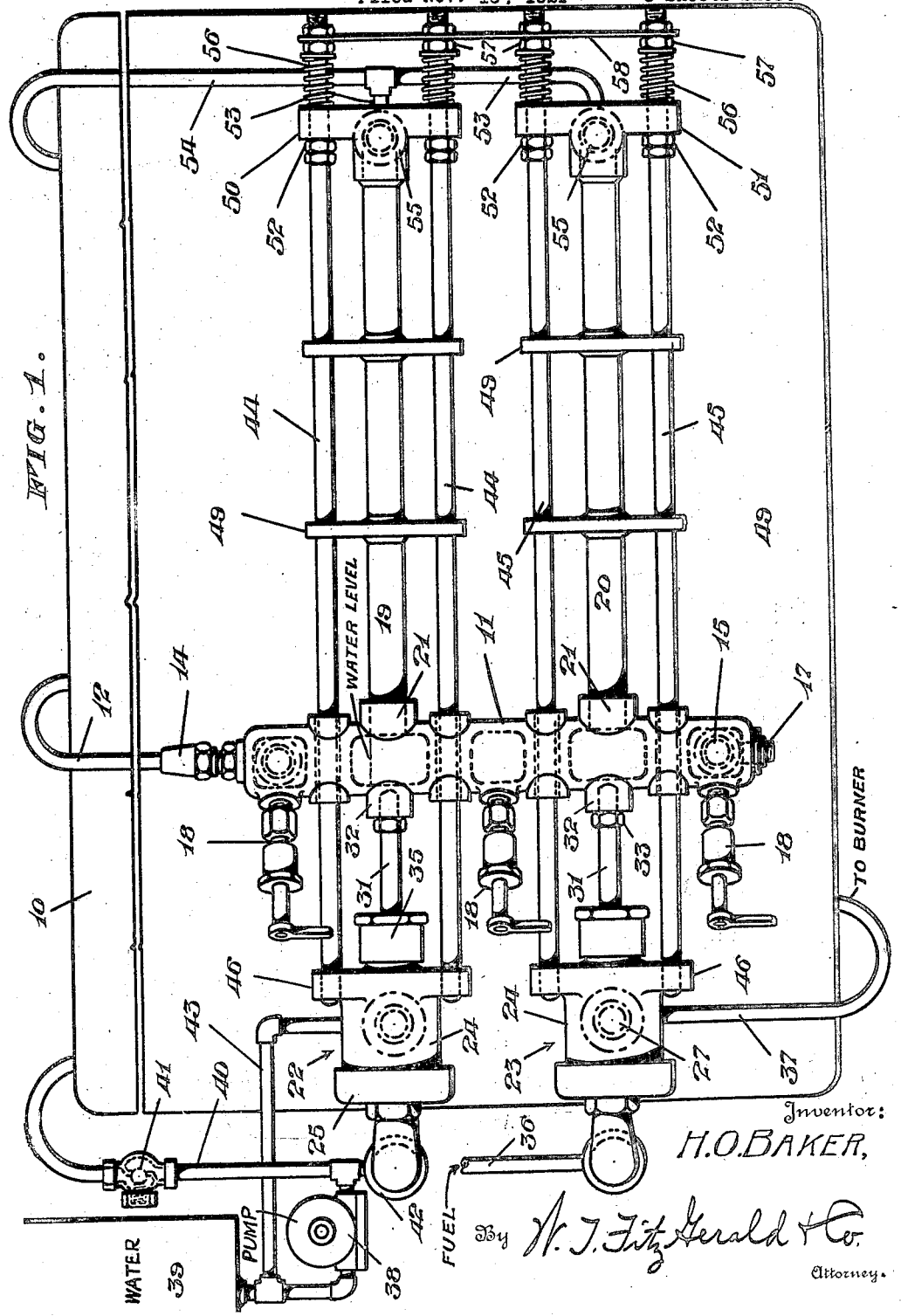

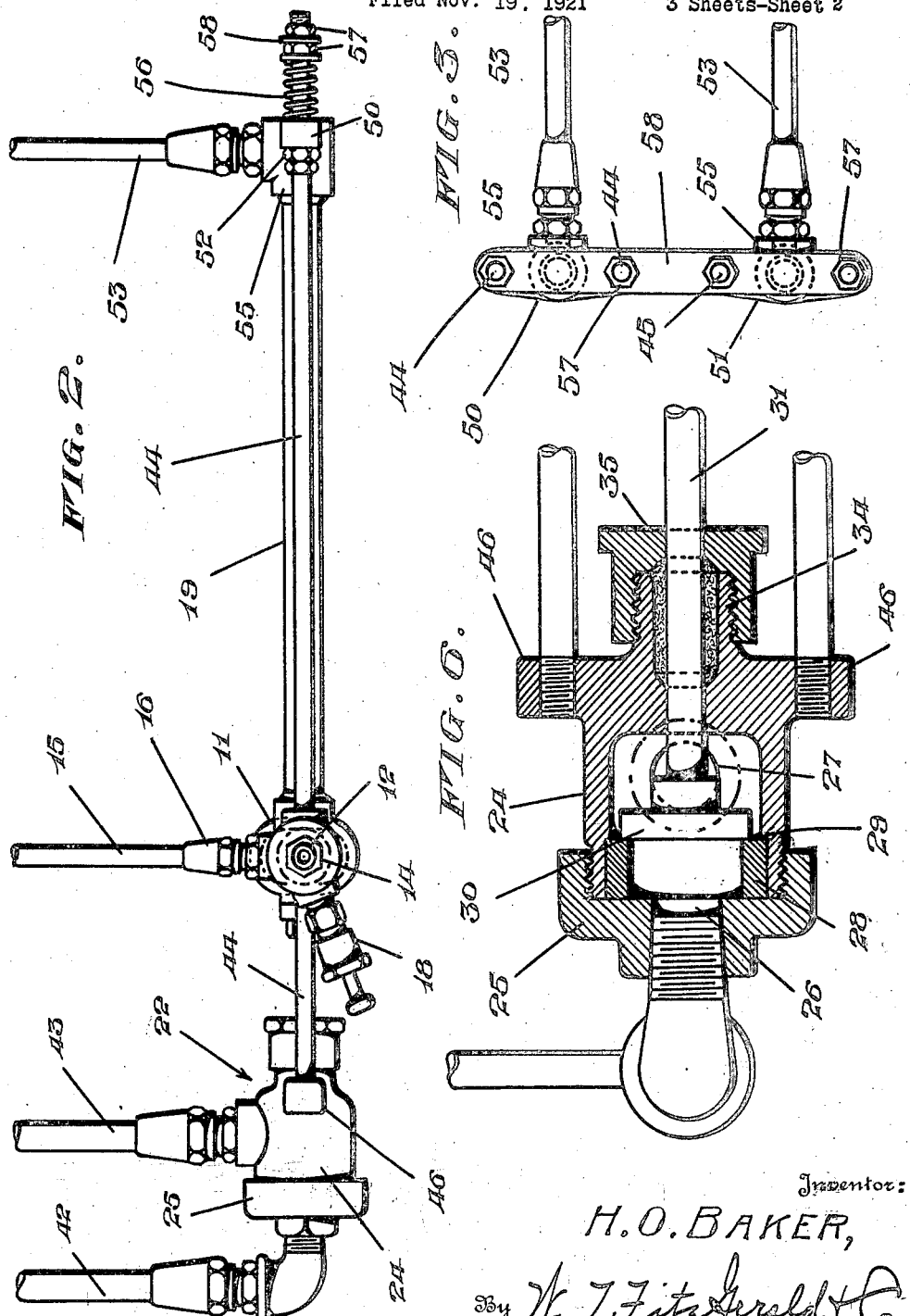

Patented Feb. 19, 1924.

1,484,546

UNITED STATES PATENT OFFICE.

HARTLEY O. BAKER, OF PUEBLO, COLORADO, ASSIGNOR TO THE BAKER STEAM MOTOR CAR AND MANUFACTURING CO., INC., OF PUEBLO, COLORADO.

COMBINATION WATER COLUMN AND WATER AND FUEL CONTROLLER.

Application filed November 19, 1921. Serial No. 516,421.

*To all whom it may concern:*

Be it known that I, HARTLEY O. BAKER, a citizen of the United States, residing at Pueblo, in the county of Pueblo and State of Colorado, have invented certain new and useful Improvements in a Combination Water Column and Water and Fuel Controller; and I do hereby declare the following to be a full, clear, and exact description of the invention, such as will enable others skilled in the art to which it appertains to make and use the same.

The present invention relates to a combination water column and water and fuel controller for use in connection with water boilers or steam generators, especially those used on steam automobiles and the like, and the invention has for its primary object the provision of a novel and improved appliance of the character indicated which will efficiently serve its purpose.

Another and more specific object is the combination with a water column, of the controlling means to provide a practical and efficient arrangement.

A further object is the provision of controlling means of novel and improved construction.

With the foregoing and other objects in view, which will be understood as the description proceeds, the invention resides in the construction and arrangement of parts, as hereinafter described and claimed, it being understood that changes can be made within the scope of what is claimed, without departing from the spirit of the invention.

The invention is illustrated in the accompanying drawings, wherein—

Figure 1 is an elevation of the device, showing a boiler and the water supplying means in diagram.

Fig. 2 is a plan view of the device.

Fig. 3 is an end view thereof.

Fig. 4 is an enlarged elevation of the water column, portions being broken away and shown in section.

Fig. 5 is another elevation of the water column, looking at right angles to the line of view in Fig. 4, portions being broken away and shown in section.

Fig. 6 is an enlarged vertical section of one of the controlling valves.

A water boiler or steam generator 10 is shown conventionally or diagrammatically in Fig. 1, which may represent any boiler with which the device can be used, and such device is arranged at one side of the boiler or at any other suitable point, the arrangement shown being illustrative.

The water column 11 comprises an elongated hollow vertical casting or shell, which has its upper and lower end portions suitably connected to the upper and lower portions, respectively, of the boiler. Thus, as shown, a pipe 12 is connected to the upper portion or steam chamber of the boiler and is connected by a suitable union 14 with the upper end of the water column. The water column has a removable plug 13 at one side adjacent to the upper end where the pipe 12 can be connected if a lateral connection is desired instead of a longitudinal end connection as shown. A pipe 15 is connected to the lower portion or water chamber of the boiler and is connected by a union 16 with the water column at one side thereof adjacent to the lower end, but the lower end of the column has a removable plug 17 for making the connection when a lower longitudinal connection is wanted. The upper and lower end portions of the column thus have end and lateral points of connection, so that the pipes can extend longitudinally or at an angle to the water column according to the arrangement wanted or required.

Attached to the water column 11 near the upper and lower ends and intermediate portion thereof, or at other suitable vertically spaced positions, are outstanding blow-off valve cocks 18 which can be opened for the discharge of water or steam, to make tests as to the water level. The water column member thus provides a water gage. The water level of the boiler can thus be determined, inasmuch as steam will be blown through those valves which are above the water level. The valves can also be used for blowing out the water column with steam, when the valves are opened, for keeping the pipes open, by forcing out any accumulations which may tend to stop up the pipes.

The device includes a pair of controlling means, one for controlling the supply of water to the boiler, and the other for controlling the supply of fuel to the burner. The arrangement is such that when the water level lowers beyond a predetermnied point, water is delivered to the boiler, and the flow shut off when the level rises to such point, and, for any reason, should the water level drop an abnormal amount so that the boiler is apt to become dry, the fuel is shut off from the burner, to avoid the coils or other portions of the boiler from being burned through by the flames if they continued to heat the boiler with little or no water therein. These controlling means are superposed, and the upper water controlling means and lower fuel controlling means include the respective substantially horizontal tubes 19 and 20, preferably composed of metal having a high coefficient of expansion. One end of each tube is secured to the water column 11, said column having, at one side, the bosses 21 into which the tubes are screwed and secured to communicate with the vertical passage of the column. The water will fill the tubes when the water level is above the tubes and as the water level is lowered, first below the tube 19 and then below the tube 20 if it drops lower, steam is permitted to enter the tubes 19 and 20 in succession. In other words, the water level being above the tubes will result in the tubes being filled with water, and when the water level is lowered below the respective tubes, the water will drain from the tubes so that the tubes become filled with steam. The steam being hotter than the water, will result in the tubes being heated to higher temperature when filled with steam, causing the tubes to expand longitudinally.

The water and fuel controlling means include the respective valves 22 and 23 located at that side of the water column opposite to the tubes 19 and 20 in alinement with said respective tubes. The valves are substantially the same, and reference is had to Fig. 6 for a detail view of either valve. The valve comprises a cup-shaped casing 24 having its mouth opposite to the water column, with a cap 25 threaded or otherwise secured on the rim of the casing and provided with a port 26. The casing 24 has a lateral port 27, and an annular valve seat 28 is fitted within the rim of the casing and bears against a shoulder 29 of the casing, said seat being secured in place by the cap 25. A valve disk or head 30 is movable within the casing 24 to bear against the seat 28 for closing the passage between the ports 26 and 27, and is secured on one end of a valve stem or rod 31. The water column 11 has bosses 32 opposite to the bosses 21 to which the rods or stems 31 are secured. As shown, the rods or stems are threaded into the bosses 32, and lock nuts 33 are threaded on the rods and bind against the bosses to maintain the adjustments of said rods. Each valve casing 24 has a stuffing box 34 containing packing, and a gland cap 35 is threaded on the stuffing box to compress the packing around the rod or stem 31, to prevent leakage.

The water valve 22 controls the supply of water to the boiler. Fig. 1 diagrammatically illustrates a pump 38 which operates continually for pumping water from a water reservoir or tank 39 through a pipe 40 into the boiler, and said pipe 40 has a suitable pressure valve 41 requiring the water to be forced past the valve under a sufficient pressure to open the valve and enter the boiler. The valve 22 is located in a shunt or by-pass with the pump 38. Thus, a connection 42 is made from between the pump 38 and valve 41 with the port 26 of the valve 22, and a connection 43 is made between the port 27 of the valve, and a point between the pump 38 and tank 39. With this arrangement, when the valve casing 24 and rod 31 of the valve 22 separate, so that the valve seat 28 and head 30 are separated, the water can pass freely from the pump 38 through the shunt or by-pass in which the valve 22 is disposed, so as to return to the tank 39 and inlet side of the pump, without being forced through the pipe 40 past the valve 41. The resistance through the shunt or by-pass is so small that the water will flow through such shunt in preference to passing the valve 41. When the valve 22 is closed by the movement of the casing 24 and rod 31 toward one another to bring the seat 28 and head 30 together, the water cannot now flow through the shunt, and is compelled, under pressure from the pump, to flow through the pipe 40 past the valve 41 into the boiler. Consequently, when the valve 22 is closed, water is forced into the boiler, and when said valve is opened, the water circulates idly through the valve 22 and shunt.

The fuel valve 23 controls the flow of gas or liquid fuel to the burner which heats the boiler, the fuel supply pipe 36 being connected to the cap 25 of the valve 23, and a pipe 37 extending from the port 27 of said pipe to the burner, so that when the casing valve 24 and rod 31 of the valve 23 are separated, to separate the valve seat 28 and head 30, to separate the valve seat 28 and head 30, to the burner, such flow of fuel can flow to the burner, such flow of fuel being stopped when the casing 24 and rod 31 are moved together to bring the valve seat and head into contact. The rods or stems 31 connect the valve heads with the water column, and the valve casings and water column are movable toward and away from one another longitudinally of the rods 31 and tubes 19 and 20.

The water and fuel controlling means have the respective parallel horizontal rods 44 and 45 above and below the corresponding tubes 19 and 20, and the casings of the valves 22 and 23 have the lugs 46 to which the corresponding ends of the rods 44 and 45 are threadedly or otherwise secured. The water column has tubular guide portions 47 connecting opposite walls of the column through which the rods 44 and 45 are slidable, thereby providing additional means for guiding the valve casings and water column toward and away from one another. The water column 11 is bulged around the tubular guides 47, as at 48, so that said guides do not restrict the flow of water upwardly and downwardly in the column. The tubular guides enable the rods to extend through the column without packing or stuffing boxes being necessary, and the parts are thus assembled to be supported one from the other in a desirable arrangement.

Cross heads 49 are brazed or otherwise secured on the tubes 19 and 20 at longitudinally spaced points and are slidable on the respective rods 44 and 45, whereby to support the rods and tubes for relative longitudinal movement, and to prevent them from buckling or bowing out of longitudinal position relatively to one another, by the contraction and expansion of the parts. Each tube 19 and 20 is located between the corresponding rods, and the tubes, rods, water column, valves 22 and 23, and other parts of the device are all located in substantially the same vertical plane so that the device can be located close adjacent to one side of the boiler, without taking up much space.

Cross heads or members 50 and 51 are secured to the ends of the respective tubes 19 and 20 opposite to the water column 11 and are disposed slidably on the respective rods 44 and 45. Nuts 52 are threaded on the rods and positioned at those sides of the cross heads 50 and 51 which face the water column, whereby the contraction of the tubes will cause the cross heads 50 and 51 to contact with the nuts or stops 52 to slide the rods 44 and 45 through the water column (toward the left, as seen in Fig. 1). Pipes 53 are secured to the heads 50 and 51, and are connected with the boiler, by means of a common connection 54, although separate connections can be used, and such connection is preferably made with the upper portion or steam chamber of the boiler, whereby when the water level is lowered below the tubes in succession, the steam passing through the pipe of connection 54 into the tubes 19 and 20, will assist in forcing the water therefrom into the water column and causing the tubes to expand. The slides 50 and 51 have elbow portions or passages 55 establishing communication between the tubes 19 and 20, respectively, and the pipes 53.

Coiled wire expansion springs 56 are disposed on the rods 44 and 45 behind the cross heads 50 and 51 opposite to the nuts 52, and are confined between the cross heads and nuts 57 threaded on the terminals of the rods, in order to provide yielding means for moving the rods with the cross heads 50 and 51 when the tubes 19 and 20, respectively, are expanded. A leaf spring 58 extends across and engages all four rods 44 and 45 and is clamped between the nuts 57, for supporting the rods one from the other, and maintaining their relative position, and said spring can flex or bend slightly, if necessary. The rods 44 and 45 are not subjected to expansion and contraction during the operation of the controller, inasmuch as the rods remain at substantially the same temperature, and any slight expansion or contraction thereof is negligible.

In operation, the water in the column 11 will rise and lower according to the water in the boiler, and when the water level is at its high point, above the upper tube 19 of the controlling means, both tubes 19 and 20 will be filled with water. This causes the water to flow into and fill up the tubes 19 and 20, which are connected at those ends remote from the water column to the steam chamber of the boiler. With the tubes filled with water and shortened, the water column 11 and cross heads 50 and 51 are moved toward one another so that the rods 44 and 45 move the column 11 and valve casings of the valves 22 and 23 apart slightly, thereby opening both of said valves. Consequently, fuel can flow to the burner, and the water from the pump 38 flows through the shunt or by-pass without entering the boiler. When the water level drops below the tube 19, so that the water flows from said tube back into the water column, steam will enter the tube 19, and being hotter than the water, will cause the tube 19 to expand, thereby separating the column 11 and cross head 50. The cross head 50 will compress the springs 56 which bear against the corresponding nuts 57 of the rods 44, thereby yieldingly moving the rods 44 with the cross head 50, and moving the casing of the valve 22 and column 11 toward one another, and closing said valve. This will stop the flow of water through the shunt or by-pass, and the water will be forced through the pipe 40 past the valve 41 into the boiler, and as soon as the water level rises to again fill the tube 19, said tube will contract, causing the cross head 50 to contact with the nuts 52 and moving the rods 44 through the column 11 for separating the valve 22 and column 11 so that said valve is again opened, to stop the delivery of water into the boiler. The water level in the boiler is thus maintained automatically at the desired high water level.

The lower controlling means provides a safety arrangement for a predetermined lower water level. Should the water level in the boiler drop, for any reason whatever, down to the tube 20 and below said tube, so that the tube 20 becomes emptied of water and filled with steam, the tube 20 will expand, and similar to the action described in connection with the tube 19, will close the valve 23, thereby shutting off the flow of fuel to the burner, and extinguishing the flames. This will avoid the boiler going dry and being burned through. The operation of the upper and lower controlling means are identical, excepting that the valves 22 and 23 control the delivery of water and fuel, respectively. The upper controlling means maintains the water level practically uniform at the desired point in the boiler, while the lower controlling means will shut off the fuel should the water level go down to a dangerous low point, because of the tank 39 becoming empty, the pump failing to force the water into the boiler, or other contingency.

The springs 56 provide for the yielding movement of the parts for bringing the valve seats and heads of the valves 22 and 23 together, and when such seats and heads contact, the springs permit the parts to move further, without becoming broken, distorted, buckled, or the like, the seats and heads simply being brought under greater spring pressure as the tubes 19 and 20 continue to expand.

Having thus described the invention, what is claimed as new is:—

1. A device of the character described comprising a water column, an expansion and contraction tube connected to the column, means connected to the tube and slidable through the column, and controlling means having relatively movable parts connected to said means and column.

2. A device of the character described comprising a water column, an expansion and contraction tube connected at one end to the column, a rod slidable through the column and connected to the expansion tube, and controlling means having relatively movable parts connected to said rod and column.

3. A device of the character described comprising a water column, an expansion and contraction tube connected at one end to the column, a rod connected to the other end of the tube and slidable through the column, and a controlling valve having parts connected to said rod and column for the opening and closing of the valve by the relative movement of the rod and column.

4. A device of the character described comprising a water column, an expansion and contraction tube connected at one end to the column, rods slidable through the column, the tube being located between the rods, cross heads engaging the tube and rods for guiding them for relative longitudinal movement, a connection between the other end of the tube and the rods for moving the rods and column relatively to one another, and controlling means connected to the rods and column.

5. A device of the character described comprising a water column, an expansion and contraction tube connected to the column, a rod slidable through the column, controlling means connected to the rod and column, and a connection between the tube and rod having a yielding action to permit of the relative movement of the tube and rod when relative movement between the rod and column is prevented by the controlling means.

6. A device of the character described comprising a water column, an expansion and contraction tube connected at one end to the column, a rod slidable through the column, controlling means having relatively movable parts connected to the rod and column, a member connected to the other end of the tube and slidable on said rod, a portion on the rod for the contact of said member when said member is moved in one direction for moving said rod in one direction, and spring means between said member and rod for yieldingly moving said rod in the other direction when said member is moved in the other direction.

7. A device of the character described comprising a water column, an expansion and contraction tube connected at one end to the column, a pair of rods slidable through the column, the tube being located between the rods, a cross head secured to the other end of the tube and slidable on said rods, a controlling valve having relatively movable parts connected to said rods and column, portions on said rods for the contact of said cross head when moved in one direction, and springs on said rods for the contact of said cross head when moved in the other direction.

8. A device of the character described comprising a water column, an expansion and contraction tube connected at one end to the column, a pair of rods slidable through the column and connected to the other end portion of the tube, the tube being located between the rods, and a controlling valve having a casing connected to said rods and a valve stem connected to the column for opening and closing the valve when said rods and column move relatively to one another.

In testimony whereof I have signed my name to this specification in the presence of two subscribing witnesses.

HARTLEY O. BAKER.

Witnesses:
W. R. ALHED,
O. T. WOLTHER.